(12) United States Patent
Bhattacharya et al.

(10) Patent No.: US 11,405,399 B2
(45) Date of Patent: *Aug. 2, 2022

(54) METHOD OF PROTECTING MOBILE DEVICES FROM VULNERABILITIES LIKE MALWARE, ENABLING CONTENT FILTERING, SCREEN TIME RESTRICTIONS AND OTHER PARENTAL CONTROL RULES WHILE ON PUBLIC NETWORK BY FORWARDING THE INTERNET TRAFFIC TO A SMART, SECURED HOME ROUTER

(71) Applicant: Gryphon Online Safety Inc., San Diego, CA (US)

(72) Inventors: Arup Bhattacharya, San Diego, CA (US); John Jun Wu, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/914,033

(22) Filed: Jun. 26, 2020

(65) Prior Publication Data

US 2020/0329048 A1 Oct. 15, 2020
US 2021/0099452 A9 Apr. 1, 2021

Related U.S. Application Data

(63) Continuation-in-part of application No. 16/907,643, filed on Jun. 22, 2020, which is a continuation of
(Continued)

(51) Int. Cl.
*H04L 29/06* (2006.01)
*H04L 9/40* (2022.01)
*G06F 21/62* (2013.01)
*G06N 20/00* (2019.01)
*G06N 5/02* (2006.01)

(52) U.S. Cl.
CPC .......... *H04L 63/101* (2013.01); *G06F 21/62* (2013.01); *G06F 21/6218* (2013.01); *G06N 5/025* (2013.01); *G06N 20/00* (2019.01); *H04L 63/104* (2013.01); *G06F 2221/2149* (2013.01)

(58) Field of Classification Search
CPC ..... H04L 63/101; H04L 63/104; G06F 21/62; G06F 21/6218; G06F 2221/2149; G06F 21/606; G06N 20/00; G06N 5/025
See application file for complete search history.

(56) References Cited

U.S. PATENT DOCUMENTS 5,754,938 A * 5/1998 Herz .................... G06Q 20/383
725/116
5,987,606 A * 11/1999 Cirasole ................ G06Q 30/06
726/11
(Continued)

FOREIGN PATENT DOCUMENTS

CN 104484852 A 11/2014
CN 105049528 A * 11/2015

*Primary Examiner* — John B King

(57) ABSTRACT

Embodiments of the present invention disclose systems and methods for controlled access to a website from a mobile device when the mobile device is connected with an external public or private network away from home. Certain embodiments provide for such protection and security through the use of smart and secure home router which is connected to the mobile device through a virtual private network, whether in a module form or as a standalone server.

17 Claims, 4 Drawing Sheets

Connection in Home Network

Related U.S. Application Data application No. 16/239,176, filed on Jan. 3, 2019, now Pat. No. 10,805,303, which is a continuation of application No. 15/443,058, filed on Feb. 27, 2017, now Pat. No. 10,212,167.

(60) Provisional application No. 62/766,628, filed on Jun. 11, 2019, provisional application No. 62/432,700, filed on Dec. 12, 2016, provisional application No. 62/300,809, filed on Feb. 27, 2016.

(56) References Cited

U.S. PATENT DOCUMENTS

| | | | | |
|---|---|---|---|---|
| 5,987,611 | A * | 11/1999 | Freund | G06F 21/552 726/4 |
| 6,230,271 | B1 * | 5/2001 | Wadlow | H04L 63/0227 726/1 |
| 7,252,230 | B1 * | 8/2007 | Sheikh | G06Q 10/087 235/384 |
| 7,716,077 | B1 * | 5/2010 | Mikurak | G06Q 10/06 705/7.12 |
| 7,882,540 | B2 * | 2/2011 | Lingafelt | H04L 67/303 726/1 |
| 8,687,485 | B1 * | 4/2014 | Dondeti | H04L 63/1408 370/230 |
| 9,043,894 | B1 * | 5/2015 | Dennison | H04L 63/1408 726/11 |
| 9,125,139 | B2 * | 9/2015 | Gholmieh | H04W 48/14 |
| 9,497,068 | B1 * | 11/2016 | Krishnamurthy | H04L 63/102 |
| 9,563,335 | B1 * | 2/2017 | DeLuca | G06F 40/274 |
| 2002/0007295 | A1 * | 1/2002 | Kenny | G06Q 30/02 705/307 |
| 2002/0133534 | A1 * | 9/2002 | Forslow | H04L 63/0272 709/200 |
| 2002/0186698 | A1 * | 12/2002 | Ceniza | H04L 12/4641 370/351 |
| 2003/0056063 | A1 * | 3/2003 | Hochmuth | H04L 67/1097 711/152 |
| 2003/0126267 | A1 * | 7/2003 | Gutta | G06F 21/85 709/229 |
| 2003/0154168 | A1 * | 8/2003 | Lautenbacher | G06Q 30/06 705/51 |
| 2004/0044761 | A1 * | 3/2004 | Phillipi | H04L 67/327 709/223 |
| 2005/0086521 | A1 * | 4/2005 | Chen | H04L 63/101 726/4 |
| 2006/0064469 | A1 * | 3/2006 | Balasubrahmaniyan | H04L 63/029 709/218 |
| 2006/0149730 | A1 * | 7/2006 | Curtis | G06F 21/6272 |
| 2007/0006292 | A1 * | 1/2007 | Jaenicke | H04L 29/06 726/11 |
| 2007/0061458 | A1 * | 3/2007 | Lum | H04L 61/2015 709/225 |
| 2007/0177575 | A1 * | 8/2007 | Osenbach | H04L 45/22 370/351 |
| 2007/0237159 | A1 * | 10/2007 | Yamada | H04L 12/4641 370/395.53 |
| 2007/0260603 | A1 * | 11/2007 | Tuscano | G06F 16/9535 |
| 2008/0021767 | A1 * | 1/2008 | Benson | G06Q 30/0631 705/7.29 |
| 2008/0021981 | A1 * | 1/2008 | Kumar | G06F 16/951 709/219 |
| 2008/0028436 | A1 * | 1/2008 | Hannel | H04L 63/0263 726/1 |
| 2009/0165096 | A1 * | 6/2009 | Hughes | H04L 63/08 726/5 |
| 2009/0249440 | A1 * | 10/2009 | Platt | H04L 63/20 726/1 |
| 2010/0118871 | A1 * | 5/2010 | Liu | G06N 5/025 370/389 |
| 2011/0070901 | A1 * | 3/2011 | Alward | G06Q 30/02 455/466 |
| 2011/0112957 | A1 * | 5/2011 | Ingram | G06Q 40/025 705/38 |
| 2011/0125925 | A1 * | 5/2011 | Bouthemy | H04L 12/4641 709/250 |
| 2011/0185437 | A1 * | 7/2011 | Tran | H04L 63/104 726/28 |
| 2011/0313863 | A1 * | 12/2011 | Carter | G06F 16/9535 705/14.66 |
| 2012/0221652 | A1 * | 8/2012 | Sainio | H04L 63/101 709/206 |
| 2013/0159519 | A1 * | 6/2013 | Hochberg | G06Q 20/4015 709/225 |
| 2013/0282630 | A1 * | 10/2013 | Attenberg | G06N 5/02 706/12 |
| 2014/0282889 | A1 * | 9/2014 | Ishaya | H04L 63/0876 726/4 |
| 2014/0298460 | A1 * | 10/2014 | Xue | H04L 63/1425 726/23 |
| 2014/0366118 | A1 * | 12/2014 | Yin | H04L 63/0254 726/12 |
| 2015/0242513 | A1 * | 8/2015 | Sanghavi | G06F 16/9535 707/734 |
| 2015/0249864 | A1 * | 9/2015 | Tang | G06Q 30/00 725/28 |
| 2016/0087942 | A1 * | 3/2016 | Yaguchi | H04L 63/08 726/4 |
| 2016/0277259 | A1 * | 9/2016 | Qi | H04L 43/045 |
| 2016/0352764 | A1 * | 12/2016 | Mermoud | G06N 20/00 |
| 2017/0063802 | A1 * | 3/2017 | Lapidous | H04L 63/0281 |
| 2017/0063940 | A1 * | 3/2017 | Lapidous | H04L 12/4641 |
| 2019/0116156 | A1 * | 4/2019 | Glazemakers | H04L 63/101 |

* cited by examiner

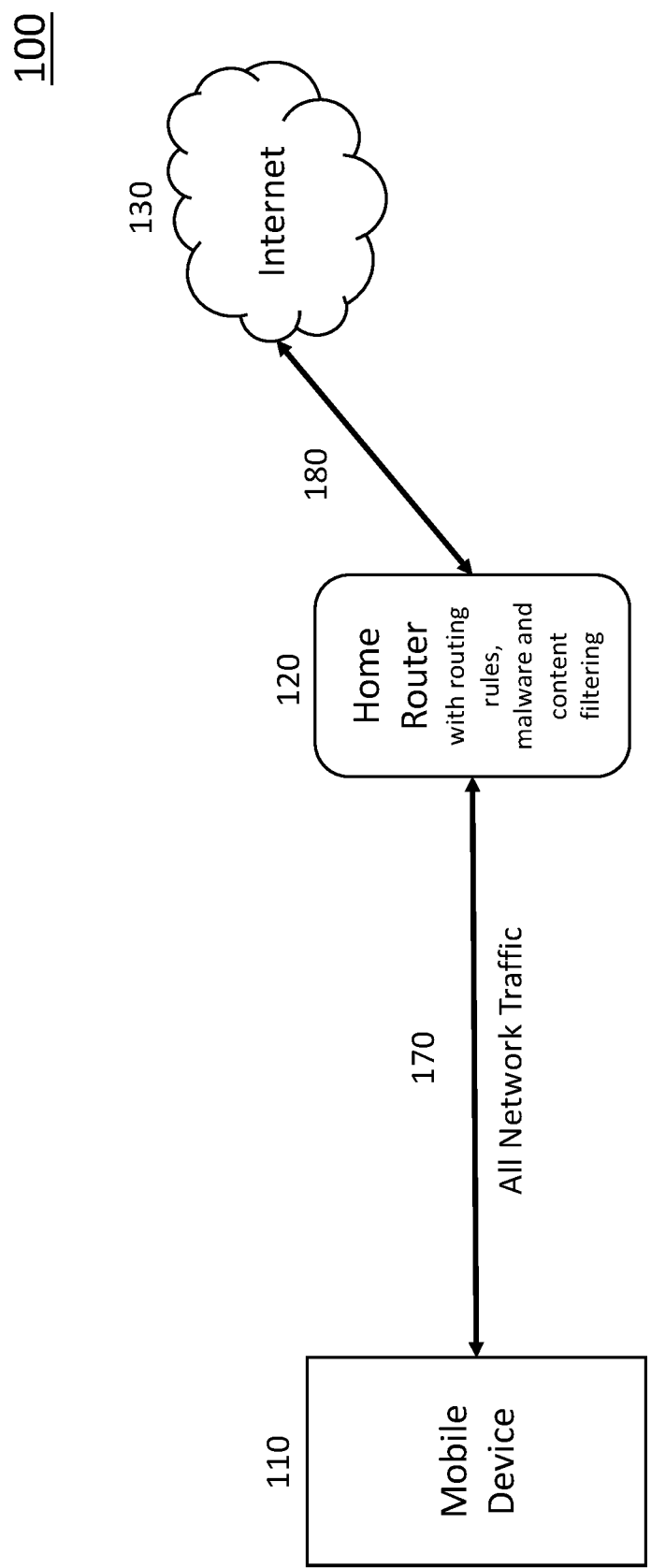
FIG. 1 – Connection in Home Network

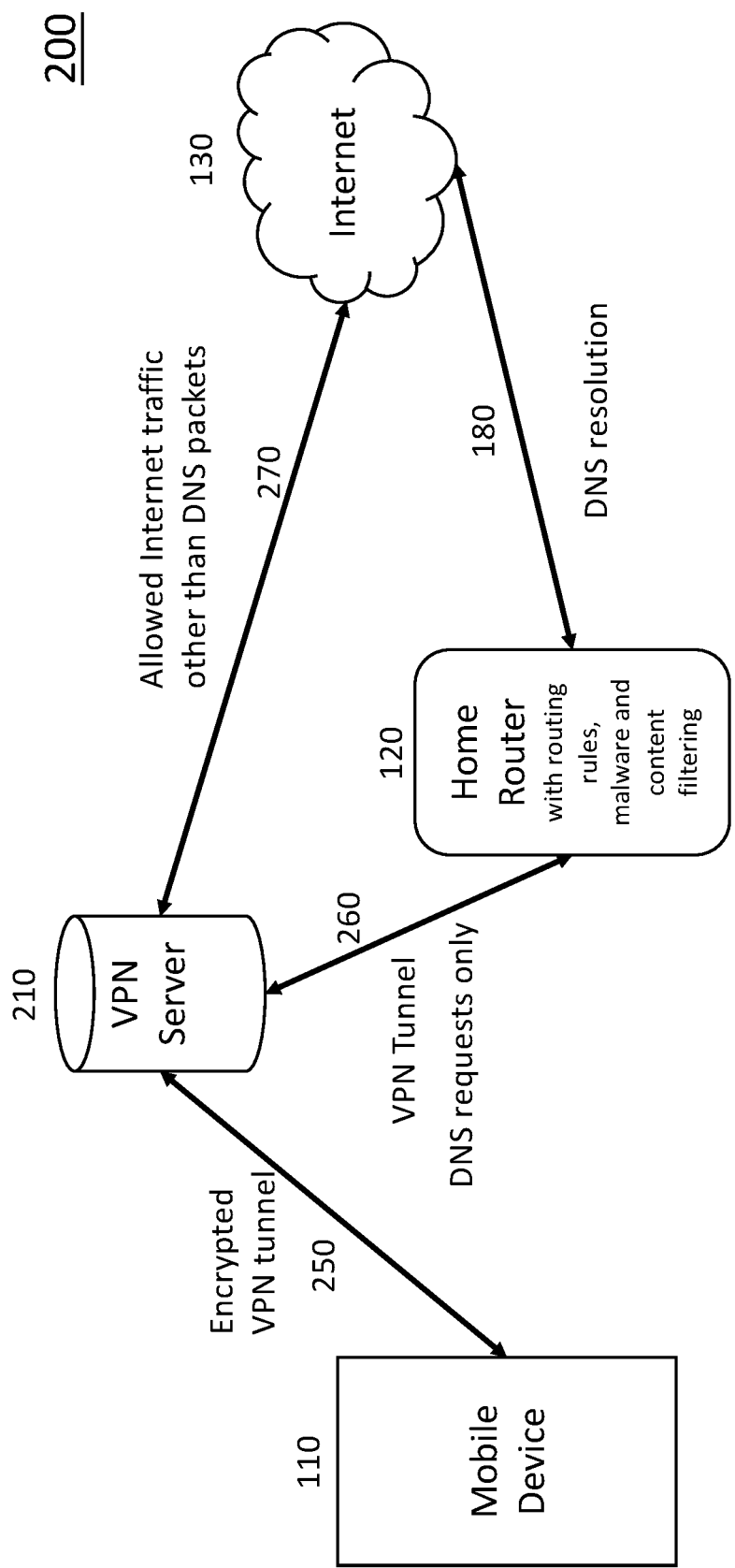
FIG. 2 – Connection Outside Home Network

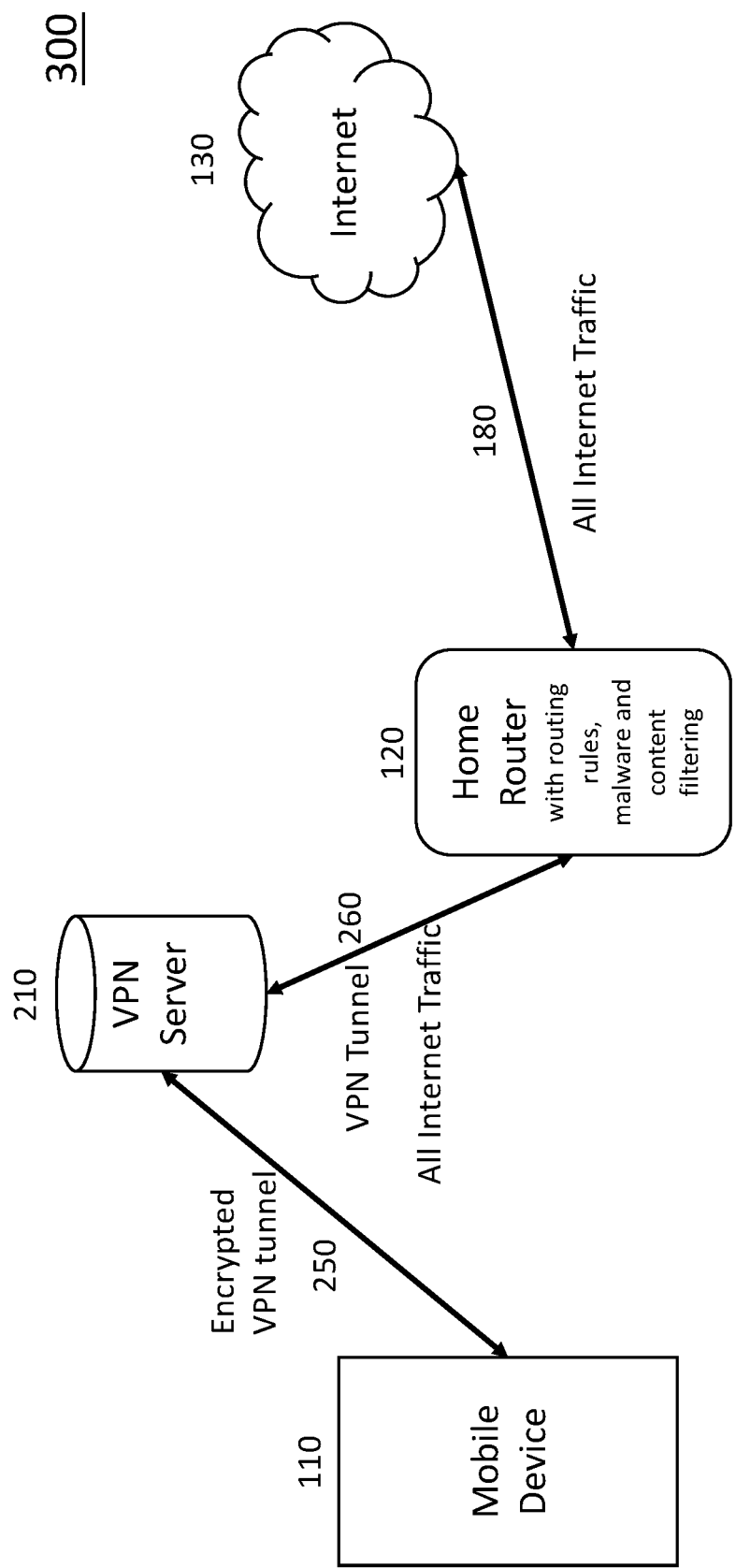
FIG. 3 – Alternate Configuration Outside Home Network

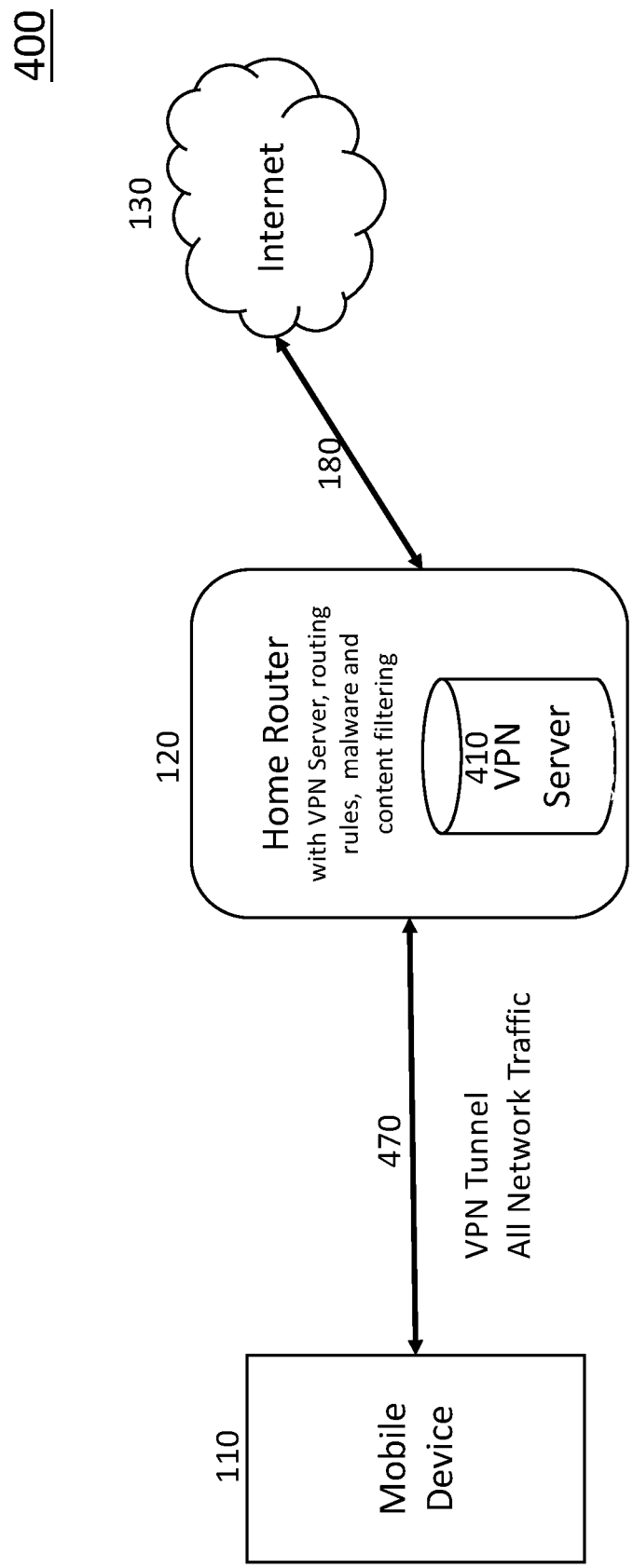
FIG. 4 – Home Router with VPN Server

METHOD OF PROTECTING MOBILE DEVICES FROM VULNERABILITIES LIKE MALWARE, ENABLING CONTENT FILTERING, SCREEN TIME RESTRICTIONS AND OTHER PARENTAL CONTROL RULES WHILE ON PUBLIC NETWORK BY FORWARDING THE INTERNET TRAFFIC TO A SMART, SECURED HOME ROUTER

RELATED APPLICATIONS

This application is related to the following:
1. U.S. Provisional Application Ser. No. 62/300,809, filed Feb. 27, 2016 (Provisional 1);
2. U.S. Provisional Application Ser. No. 62/432,700, filed Dec. 12, 2016 (Provisional 2);
3. U.S. Provisional Application Ser. No. 62/766,628, filed Jun. 11, 2019 (Provisional 3).
4. U.S. Utility application Ser. No. 15/443,058, filed Feb. 27, 2017 (Parent 1); and
5. U.S. Utility application Ser. No. 16/239,176, filed Jan. 3, 2019 (Parent 2).
6. U.S. Utility application Ser. No. 16/907,643, filed Jun. 14, 2020 (Parent 3).

This application claims priority to the Provisional 1, Provisional 2, Provisional 3, Parent 1, Parent 2, and Parent 3 and hereby claims benefit of the filing date of each thereof pursuant to 35 U.S.C. 119 and 37 CFR § 1.78(a). The subject matter of the Provisional 1, Provisional 2, Provisional 3, Parent 1, Parent 2, and Parent 3 in its entirety, is expressly incorporated herein.

BACKGROUND OF THE INVENTION

Field of the Invention

The present invention relates to methods, systems and apparatus for enabling controlled browsing of the internet on mobile devices to provide user safety.

Description of Related Art

Parents with underage children have a need to control their children's web browsing activities to prevent access to harmful, unsafe or inappropriate websites. This becomes especially true when the children are using mobile devices to browse the web outside of their homes. The current mechanisms to allow such control is through the use of certain parental controls available on some mobile devices as well as through the use of dedicated applications on such mobile devices which often use white lists and black lists to allow or deny access respectively to requested websites to protect against inappropriate web content. These controls are static in nature and generally do not provide adequate protections as compared to what may be available when the children are connecting through their home networks.

For the reasons stated above, and for other reasons stated below which will become apparent to those skilled in the art upon reading and understanding the present specification, there is a need in the art for methods, systems and apparatus for enabling controlled browsing of the internet from mobile devices when away from home networks to provide user safety.

A parent or guardian desires to protect their children's activity on the internet by blocking certain websites or content from connected devices. In some cases, the parent has internet filtering software installed on a computer or tablet. In other cases, a router is used and configured to block undesirable content. Current solutions are often difficult to use and time consuming to configure and set up. Typically, the white list/black list of allowed/disallowed content, respectively, must be manually entered by a user, which takes time, or added on a case by case basis.

Hardware router solutions are available that may provide the desired level of protection to devices that are on the home network where the network traffic is being controlled through the router. Systems may also exist that allow some level of remote control on the inbound and outbound traffic by a parent by using their own connected devices to service a request from a child to access specific websites remotely when the child is connected to the home network and the access is being controlled by an element in the home network.

Unfortunately, none of these systems are able to provide support for such controls when the child is not connected to the home network. The parents have little means of control when the child is using a device that is not connected to the home network. Therefore, the current solutions restrict the reach of the parental control, and need the parents to be present for controlling and configuring the system for the control which is not always possible when the device is being used outside the home.

In a typical connected home, the users are concerned about three issues: i) accidentally encountering online content that is inappropriate for the user's age; ii) individuals spending too much time online; iii) chances of getting infected by Malware. A new generation of smart and secure home routers may be able to provide a solution of all three issues while the devices are connected to the home network.

The current usage of mobile devices while away from home network doesn't ensure the same level of protections that above smart and secure home routers may provide such as malware detection, content filtering and screen time management. Public Hotspots are known to be hacker prone and are known to frequently infect the devices with Malware.

Parents usually do not have any visibility while children are using internet away from home (on cellular network or public Hotspots) as well as they do not have any control to manage the content of public Hotspots or cellular network Thus, though the evolution of mobile devices and the pervasive availability of wireless networks make internet more accessible, it on the other hand also create additional challenges due to increased vulnerability and as a consequence underscore the need for content filtering and screen time management for children connecting to the internet even when not connecting to the internet using their home networks.

There exists a need for a system and method that seamlessly provide the same level of protection for the mobile devices that home routers are providing, while away from home.

Therefore, there exists a need for systems, methods and apparatuses that seamlessly provide the same level of protection for the mobile devices that home routers are providing when connecting to the internet from home networks.

BRIEF SUMMARY OF INVENTION

This Summary is provided to introduce a selection of concepts in a simplified form that are further described below in more detail in the Detailed Description. This Summary is not intended to identify key or essential features of the claimed subject matter.

Various embodiments provide methods, systems and, apparatus for controlled access to a website from a mobile device when the mobile device is connected with an external public or private network away from home. Certain embodiments provide for such protection and security through the use of smart and secure home router which is connected to the mobile device through a virtual private network (VPN) connection.

The instant invention involves forwarding the internet traffic associated with mobile devices over a VPN to a smart and secured home router which implements appropriate protections against vulnerabilities and is capable of protecting users, especially children, from inappropriate web content and as a result seamlessly provide the same level of protection when they are connecting to the internet outside their homes as the protections provided in their homes.

BRIEF DESCRIPTION OF DRAWINGS

The several embodiments may be more fully understood by a description of certain embodiments in conjunction with the attached drawings in which:

FIG. 1 illustrates an embodiment of a traditional home network system where the mobile device internet traffic is controlled by a secured home router.

FIG. 2 illustrates an embodiment of a system for implementing the invention that diverts the internet traffic for the mobile device connecting outside the home network through a standalone server that provides VPN service and is also connected to the secured home router.

FIG. 3 illustrates another embodiment of a system for implementing the invention that diverts the mobile device internet traffic through the secured home router in conjunction with a server that supports VPN.

FIG. 4 illustrates an embodiment of a system for implementing the invention that diverts the internet traffic to a secured home router that provides VPN services directly implemented in the router.

DETAILED DESCRIPTION

In the following detailed description of embodiments of the invention, numerous specific details are set forth in order to provide a thorough understanding of the embodiment of invention. However, it will be obvious to a person skilled in art that the embodiments of invention may be practiced with or without these specific details. In the description of other instances, well known methods, procedures and components have not been described in details, so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

The present invention provides a system and a method for providing the same level of protection to a mobile device whether using a protected home network to connect to the internet or connecting through a possibly unsecure and unmanaged public wireless network by use of a smart secured router in a home network in conjunction with either a standalone intermediary VPN server or an internal module in the smart secured router that provides similar features and functionality. Further, the present invention also provides a system and a method for remotely monitoring, managing, controlling and configuring the internet access for a mobile device even when the mobile device is not connected to the internet using the home network controlled by the smart secured router.

Referring to FIG. 1, which is an illustrative embodiment of a mobile device connecting to the internet through a home network, a system 100 is presented that includes a mobile device 110, connected to smart secured router 120, by a network communication channel 170 which carries all network traffic for the mobile device 110. The router 120 applies certain routing rules as well as protects from malware and is capable of performing content filtering on content being accessed by the mobile device 110 from the internet 130 through the router network connection 180 to the internet 130. As is evident from FIG. 1, the router intercepts all traffic coming from and going to the mobile device 110 and as a result can apply the routing rules to protect the user, especially a child, from malware and vulnerabilities on the internet as well as guard against inadvertent exposure to inappropriate content by applying a set of routing rules.

If the mobile device was to connect to the resources on the internet through an unsecured public network, it is subject to numerous vulnerabilities due to the risks associated with public hotspots and wireless networks which are prone to malware and hackers who are looking to steal information of other users on such networks. Furthermore, it is impossible for a parent or administrator to control the access of a child who is using mobile device with this connection topography. Even for adults, they have to be on the lookout for significantly increased risks associated with the unsecured, unmanaged public wireless networks.

This protection capability is lost if the mobile device is connecting to the internet outside of the home network as the smart secured router in the home network is not available to apply the routing rules and access restrictions in place for the child. Present invention enables the same level of security and protection as available when connecting to the internet from a home network to a child to be provided to the child connecting to the internet even when connecting outside the home network and it further enables controls and restrictions on internet usage or access to specific websites by the child even when connecting to the internet using networks outside of the home network.

Referring to FIG. 2, an embodiment of a system configuration is illustrated where the mobile device 110 is connecting to the internet when not on the home network. This particular embodiment demonstrates the connection to be redirected through a standalone VPN server 210. In the particular embodiments described in FIG. 2, the VPN server 210 is also connected to the internet 130 through a network connection 270 and the router 120 is also connected to the internet 130 by the network connection 180.

Referring again to FIG. 2, in certain embodiments there may be an application on the mobile device which detects when the device is not on the home network and if it finds that to be the case, it can establish an encrypted VPN tunnel 260 to the predetermined VPN server 210. In certain embodiments, the VPN server 210 may have a public IP address and the mobile device 110 may have access to the authentication certificate and knowledge of the public IP address for the VPN server 210 as well as the port information which needs to be opened to establish the encrypted connection 250 between them. Certain embodiments may also provide a static IP address to the mobile device 110 which is the VPN client to the VPN server 210. Still other embodiments may also share the mobile device 110's MAC address with the VPN server 210 to enable it to authenticate the connecting VPN client. Once the mobile device has established the encrypted VPN tunnel 250 with the VPN server 210, in certain embodiments, the server 210 may already have a predefined mechanism to establish a separate VPN tunnel 260 with the home router 120. In other embodiments, the VPN server 210 may use other mechanisms available to route other protocols over an IP network such as generic routing encapsulation protocol that enables encapsulated packets in order to route other protocols over IP network. Some embodiments may implement the desired routing by using IP tables and routing tables to create rules to route network traffic to router 120 via the VPN tunnel 260. The router 120 shall be another VPN client to the VPN server 210 and in certain embodiments, the router 110 may use the local gateway on the home network as default gateway to establish the VPN tunnel 260.

In some embodiments, the VPN server may maintain a list of static IP addresses that can be assigned to VPN clients based upon the client's ID which may be the device's MAC address. Similarly, the router 120 may, in certain embodiments, may contain the authentication file and the IP address for the VPN server as well as appropriate port addresses to open the VPN tunnel 260 to use it for routing traffic. The VPN server 210 shall provide encryption support to allow for encrypted transfers and some embodiments may implement such encryption using AES 128 bit or AES 256 bit encryption algorithms. Similarly, in certain embodiments, the mobile device 110 may implement additional security measures to prevent man in the middle attacks on the device by using pinned certificates.

In the specific embodiment illustrated in FIG. 2, the VPN tunnel 260 is used by VPN server 210 only for transmission of the DNS request for the target internet address to be accessed by the mobile device 110. The home router 120 next resolves the DNS request to an actual IP address by interfacing with the internet domain name servers using the network connection 180 to the internet 130. Limiting the transmission on VPN tunnel 260 to DNS requests only may allow for more efficient use of the bandwidth as compared to the case where the transmission includes all of the internet traffic to/from the mobile device 110. The router 120 may proceed to apply the routing rules and access restrictions and check for any malware or vulnerabilities associated with the target internet site that the mobile device is trying to access and based on the results after the rules are applied and analysis is completed can return to the VPN server 210 either an address for a page notifying that the access to that particular internet site is denied or the actual resolved address for the page that the user is trying to access from the mobile device 110. If the internet site is found to be allowed without any vulnerabilities and malware, the mobile device 110 can connect to the site through the VPN server 210 connected to the internet 130 by the network connection 270.

Referring to FIG. 3, this presents another embodiment to practice the invention describes in the instant application. All the components described in this embodiment are same as described in FIG. 2, except for the fact that the VPN Server 210 is a private server not accessible on the internet in absence of knowledge of fixed address to access it and only provides connection to known preprogrammed devices. In effect the general purpose network connection 270 between the VPN server 210 and internet 130 in FIG. 2 is not present in this embodiment. In this embodiment, instead of sharing only the DNS related traffic between the VPN server 210 and home router 120 through the VPN tunnel 260 and directing the rest of the internet traffic to the mobile device 110 through the VPN server 210 on network connection 270, all of the internet traffic from and to the mobile device 110 is routed through the smart secured home router 120 by using the router's network connection 180 to the internet 130 with the VPN server 210 connecting the mobile device 110 and router 120 by means of two separate VPN tunnels 250 and 260 respectively. This embodiment may result in extra traffic through the router 120, but also enables the router 120 to run the routing rules associated with malware detection and content filtering in real time on the full network data to and from the mobile device 110. In certain embodiments, the router rules implemented in router 120 may be supplemented by rules associated with the user of the mobile device 110 based on a repository of user profiles and other website specific data available to the router 120 through access to databases stored locally or in the cloud.

FIG. 4 describes another embodiment to practice the invention in which the VPN server is implemented inside the smart secured home router instead of it being a standalone VPN server. As illustrated in FIG. 4, this particular embodiment demonstrates the connection between the mobile device 110 and the internet 130 to be redirected through an embedded VPN server module 410 in the smart secured home router 120. The home router connects to the mobile device 110 through an encrypted VPN tunnel 470 between the mobile device 110 and the VPN module 410 in the router 120. The embodiment otherwise operates in a similar manner as described for the embodiment discussed in FIG. 3.

In certain embodiments, an application may be installed on mobile devices to enable an encrypted VPN function to forward the internet traffic to the home router using the VPN. A private communication channel between a mobile device and a secured router may be used to route all mobile device network traffic through the router. The router is configured to apply a set of routing rules and access restrictions to the network traffic for the mobile device and may disable or block the mobile device access to network traffic not supported by the set of routing rules configured for the home network.

In certain embodiments, the set of routing rules may include content filtering rules to filter out inappropriate content. Similarly, the routing rules may track the usage associated with a particular mobile device and enforce limitations on how much time may be spent on the internet with that device and implement certain rules for screen time restrictions for that device.

In certain embodiments the set of routing rules may include information about known vulnerabilities from malware in order to provide protection from known malicious malware. It will be understood by a person skilled in the art that the existing information about malware and vulnerabilities can be used in numerous ways to create the set of routing rules. The secured home router may provide support for enforcing any firewall rules implemented on the home network to all traffic for the connected mobile device outside the home network as well.

In certain embodiments, a set of routing rules and access restrictions may be created in conjunction with the device identification information of the device, such as its MAC address, and information about the user of the device based on a user profile which may include various parameters associated with the user, such as user's age, allowed websites, blocked websites, specific times or days of the week when the user has access to internet or a specific site, a group membership, and similar other restrictions imposed on the user or parameters associated with the user profile. Embodiments may implement the secured home router to use other unique identifiers of that device that associate the device to a specific user or individual and may enforce the application of associated access rules.

In another embodiment, a rating system is provided that may help in refining the set of routing rules. The rating system may include ratings provided by one or more users to the internet content based on one or more parameters. The ratings may depict the understanding, influence, thoughts, and affinity of the users about a particular internet content. If a website is rated low by a user it means that the user believes the particular website is not appropriate to be accessed. Further, the ratings may depend on certain parameters, such as shared interest, child's age, religious belief and the like. Therefore, the implementation of the set of routing rules may consider the ratings of the internet content provided by other users who share such common parameters.

The set of routing rules can be configured to restrict access to undesired or unwanted internet content, thus can effectively serve as a control for restricting a user from accessing unwanted material from the internet connected user devices even when not connecting on the home network. The control may be implemented for restricting children, students, employees, or in any other setting where a restricted access is required or desired.

Embodiments of the invention can be practiced with the mobile device connected to the internet by means of various network connections for the device, for example and not as a limitation, a mobile device connected to the network through a cellular network, an unsecured wireless network, an unmanaged wireless network, a public or private wi-fi hotspot, guest network, etc.

As is evident from the preceding discussion, it will be understood that the invention can be practiced with various implementations. In one such embodiment the router may provide support for a VPN client in conjunction with VPN server functionality on an intermediary server along with a VPN client on the mobile device. In other embodiment, the secured home router may provide support for VPN server functionality in the secured router itself and connect with a VPN client on the mobile device directly or through multiple encrypted tunnels through intermediary systems.

Exemplary embodiments may practice the invention by implementing varying amounts of data exchange between the secured home router and the mobile device or the intermediary server. In certain embodiments, all network traffic data from the mobile device may be routed through the secured home router, whereas in other embodiments the mobile device network traffic may be routed through the intermediary server with only a subset of that network traffic being exchanged with the secured home router to identify the mobile device, the user and or application of specific set of routing rules from the router.

Instead of forwarding whole traffic, the intermediate VPN server may only forward a limited amount of network traffic to the secured router in order to improve efficiency. The data exchanged with the secure home router in such embodiments may include, as an example and not as a limitation, entire internet traffic, DNS requests, control network traffic, unique identification of the mobile device, unique identification associated with the user of the mobile device, etc.

In certain embodiments, features may be provided to monitor any installation, uninstallation or modification of different system applications or user applications on the mobile device. Certain embodiments may also provide support to notify an admin if any such changes are made on the mobile device. Certain embodiments may implement such monitoring and notification services for addition, deletion or modification of specific or select applications, executables, digital files, data or specific storage elements on the mobile device, whereas other embodiments may implement such services indirectly in conjunction with other algorithms and schemes to validate and protect data on the mobile device, such as hash algorithms, encryption and locked assets.

It will be understood that the terms mobile device and servers used in the instant application refer to various types of devices that may be described by those terms, such as tablets, feature phones, smart phones, general purpose computers, targeted application specific computers and computing devices, connected cameras, connected home devices such as door bells, alarm systems with sensors, monitoring systems, control systems and other IoT (internet of Things) devices.

In certain embodiments the secured home router may communicates its public internet Protocol (IP) address to mobile devices for direct connection between the two. In other embodiments the mobile device may be able to obtain the secured router's public IP address by other means, such as use of a particular website, application or subscription service.

In embodiments, the home router may implement the identification of specific mobile devices through the use of the unique identifier such as the mobile device's Mac address. In some embodiments the router may utilize the same content filtering and time restrictions as used in home network and automatically apply such restrictions to the traffic associated with the mobile device connected to the router through the VPN. In other embodiments, the router may implement a different set of rules for devices connected directly in the home network and a separate set of rules for devices connected through the VPN. In yet other embodiment, the set of rules may depend upon the resource being connected to, such as a different set of rules for connection to a resource within the home network as compared to the set of rules associated with connection to an external resource.

In certain embodiments, a mechanism may be provided for detecting an undesirable attempt, such as deletion or access to certain data or application on the mobile device, and notifying an admin.

In embodiments, the VPN module may be configured to create an encrypted secure private tunnel to the mobile device, through which it is capable of receiving the mobile device's network traffic data. The router may be configured to use and apply a set of rules for the mobile device to access the internet. The application of such set of rules may determine whether the mobile device's access to internet is allowed or should the access be blocked to protect the user from accessing undesirable content or be subject to malware intrusion. If the rules allow access to such content, the mobile device's network traffic data to the internet may be forwarded on the internet, else it may be blocked.

In certain embodiments of the system, the VPN module may be a separate standalone server connected to the router by a second VPN tunnel. The invention as described is capable of being practices in various topologies as to the connection of the mobile device to the internet, for example the unsecured network connection may be an open and unsecure wireless network, a public hotspot prone to malware intrusions or even a compromised cellular network.

Certain embodiments of the system may include parameters associated with a user profile. Such profiles associated with a user of the mobile device may further comprise parameters such as age of the user, time of day, day of week, safety rank, access level associated with that user, user's job title or group membership among other possible parameters.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object oriented programming language, and/or in assembly/machine language.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub combinations of the disclosed features and/or combinations and sub combinations of several further features disclosed above. In addition, the logic flows depicted in the accompanying figures and/or described herein do not necessarily require the particular order shown, or sequential order, to achieve desirable results. Other implementations may be within the scope of the following claims.

We claim:

1. A method to protect a mobile device, said method comprising the steps of:
controlling a network by a secured router;
operating the mobile device on an external network, said mobile device comprising a processor, said external network outside control of the secured router;
creating a virtual private network between the mobile device and the secured router, the mobile device operating on the external network;
routing a network access request for the mobile device operating on the external network through the secured router;
applying a set of routing rules associated with the network controlled by the secured router to said network access request to determine at least one of allowing and denying said network access request, said denying determined by default, said allowing determined only by positive determination to allow access, wherein said denying blocks the mobile device from accessing the internet; and
performing one of allowing and denying said network access request based on the determination.

2. The method of claim 1, wherein the set of routing rules comprise content filtering rules.

3. The method of claim 1, wherein the set of routing rules comprise screen time restrictions.

4. The method of claim 1, wherein the set of routing rules comprise information about known vulnerabilities from malware.

5. The method of claim 1, wherein the network access request includes at least one of: a cellular network, an unsecured wireless network, and an unmanaged wireless network.

6. The method of claim 1, wherein the virtual private network is created by routing the network access request to an intermediary VPN server over an encrypted VPN tunnel.

7. The method of claim 1, wherein the mobile device is one of a tablet, a phone, a computer, and an IoT device.

8. The method of claim 6, wherein the intermediary VPN server forwards at least one of: all network traffic, DNS requests, and control traffic to the secured router.

9. The method of claim 6, wherein the intermediary VPN server is embedded in the secured router.

10. The method of claim 6, wherein the intermediary VPN server communicates its public IP address to the mobile device.

11. A website access control system comprising:
a network controlled by a secured router;
a mobile device comprising a processor, said mobile device operating on an external network, said external network outside control of the secured router;
the secured router having a set of rules associated with the mobile device's access to the internet;
a VPN server configured to:
    establish a VPN tunnel with the mobile device;
    receive a request from the mobile device operating on said external network to access the internet;
    receive network traffic data from the mobile device through the VPN tunnel;
said secured router configured to:
    apply the set of rules to said request to determine whether to allow the mobile device access to the internet;
    permit the mobile device to access the internet if access is allowed by applying the set of rules; and
    block the mobile device access to the internet unless access is allowed by applying the set of rules.

12. The website access control system of claim 11, wherein the VPN server is connected to the secured router by a second VPN tunnel.

13. The website access control system of claim 11, wherein the network connection is one of a wireless network, a hotspot, and a cellular network.

14. The website access control system of claim 11, wherein the set of rules comprises a user profile.

15. The website access control system of claim 12, wherein the set of rules comprises a user profile.

16. The website access control system of claim 14, wherein the user profile further comprises at least one of: an age of the user, a time of day, a day of week, a safety rank, an access level, a job title, and a group membership.

17. The website access control system of claim 15, wherein the user profile further comprises at least one of: an age of the user, a time of day, a day of week, a safety rank, an access level, a job title, and a group membership.

* * * * *